(12) United States Patent  (10) Patent No.: US 12,554,020 B2
Zhang  (45) Date of Patent: Feb. 17, 2026

(54) CHARGING STATION, INTELLIGENT ROBOT, AND CHARGING SYSTEM

(71) Applicant: Willand (Beijing) Technology Co., LTD., Beijing (CN)

(72) Inventor: Haifeng Zhang, Beijing (CN)

(73) Assignee: Willand (Beijing) Technology Co., LTD., Beijing (CN)

(*) Notice: Subject to any disclaimer, the term of this patent is extended or adjusted under 35 U.S.C. 154(b) by 698 days.

(21) Appl. No.: 17/991,057

(22) Filed: Nov. 21, 2022

(65) Prior Publication Data

US 2023/0087251 A1  Mar. 23, 2023

Related U.S. Application Data

(63) Continuation of application No. PCT/CN2021/095123, filed on May 21, 2021.

(30) Foreign Application Priority Data

May 26, 2020 (CN) .......................... 202020912281.9

(51) Int. Cl.
*G01S 19/07* (2010.01)
*A01D 34/00* (2006.01)
(Continued)

(52) U.S. Cl.
CPC .......... *G01S 19/071* (2019.08); *A01D 34/008* (2013.01); *B60L 53/12* (2019.02);
(Continued)

(58) Field of Classification Search
CPC ...... B60L 53/12; B60L 53/60; B60L 2200/40; H02J 7/0042; H02J 50/10; H02J 50/90;
(Continued)

(56) References Cited

U.S. PATENT DOCUMENTS 5,359,521 A * 10/1994 Kyrtsos ................... G01S 19/41
                                                        701/470
5,490,073 A *  2/1996 Kyrtsos ................... G01S 19/41
                                                        701/470
(Continued)

FOREIGN PATENT DOCUMENTS

CN       101435861 A      5/2009
CN       106717462 A      5/2017
(Continued)

OTHER PUBLICATIONS

PCT International Search Report of PCT/CN2021/095123 issued on Aug. 20, 2021.

*Primary Examiner* — Jared Fureman
(74) *Attorney, Agent, or Firm* — Emerson, Thomson & Bennett, LLC; Roger D. Emerson; Peter R. Detorre

(57) ABSTRACT

The present disclosure discloses a charging station, an intelligent robot, and a charging system. The charging station includes a control chip, a charging apparatus, and a differential positioning apparatus. The charging apparatus is electrically connected to the control chip, and the differential positioning apparatus is communicatively connected to the control chip, where the control chip is configured to receive first observation information and position information of the charging station sent by the differential positioning apparatus, and send the first observation information and the position information to an intelligent robot, and configured to control the charging apparatus to charge the intelligent robot.

19 Claims, 2 Drawing Sheets

(51) Int. Cl.
*A01D 101/00* (2006.01)
*B60L 53/12* (2019.01)
*B60L 53/60* (2019.01)
*H02J 7/00* (2006.01)
*H02J 50/10* (2016.01)
*H02J 50/90* (2016.01)

(52) U.S. Cl.
CPC ............ *B60L 53/60* (2019.02); *H02J 7/0042* (2013.01); *H02J 50/10* (2016.02); *H02J 50/90* (2016.02); *A01D 2101/00* (2013.01); *B60L 2200/40* (2013.01)

(58) Field of Classification Search
CPC ... Y02T 90/12; Y02T 10/7072; A01D 34/008; A01D 2101/00
See application file for complete search history.

(56) References Cited

U.S. PATENT DOCUMENTS

| | | | | |
|---|---|---|---|---|
| 5,563,786 A * | 10/1996 | Torii | ............... | G01S 5/0009 701/469 |
| 5,938,704 A * | 8/1999 | Torii | ............... | G05D 1/0278 701/472 |
| 9,895,988 B2 * | 2/2018 | Koizumi | ............... | B60L 53/126 |
| 10,243,379 B1 * | 3/2019 | Kwa | ............... | B25J 19/005 |
| 10,703,217 B2 * | 7/2020 | Ogawa | ............... | B66B 7/00 |
| 10,811,905 B2 * | 10/2020 | Obayashi | ............... | H02J 50/10 |
| 10,928,833 B2 * | 2/2021 | Reigo | ............... | G01S 19/14 |
| 11,076,529 B2 * | 8/2021 | Chen | ............... | G05D 1/028 |
| 11,161,422 B2 * | 11/2021 | Andriolo | ............... | H02J 50/10 |
| 11,309,725 B2 * | 4/2022 | Chu | ............... | H02J 7/0044 |
| 11,378,979 B2 * | 7/2022 | Zhou | ............... | A01D 34/008 |
| 11,442,448 B2 * | 9/2022 | He | ............... | G05D 1/0214 |
| 11,910,742 B2 * | 2/2024 | Ko | ............... | B25J 11/008 |
| 11,966,235 B2 * | 4/2024 | Sørensen | ............... | G01S 19/073 |
| 11,989,017 B2 * | 5/2024 | Ko | ............... | B60L 53/30 |
| 12,117,532 B1 * | 10/2024 | Blanton, Jr. | ............... | G01S 19/071 |
| 12,323,085 B2 * | 6/2025 | Bell | ............... | H02S 30/20 |
| 2017/0215336 A1 * | 8/2017 | Andriolo | ............... | B60L 53/34 |
| 2018/0364735 A1 | 12/2018 | Holmström et al. | | |
| 2018/0370376 A1 | 12/2018 | Liu et al. | | |
| 2019/0097443 A1 * | 3/2019 | Kwa | ............... | B60L 53/30 |
| 2019/0339710 A1 * | 11/2019 | Sørensen | ............... | G05D 1/028 |
| 2019/0369640 A1 * | 12/2019 | He | ............... | G06Q 10/04 |
| 2021/0152000 A1 * | 5/2021 | Chu | ............... | H05K 7/20154 |
| 2021/0228039 A1 * | 7/2021 | Brouwers | ............... | G05D 1/0242 |
| 2021/0234401 A1 * | 7/2021 | Kobayashi | ............... | H02J 50/10 |
| 2023/0176225 A1 * | 6/2023 | Mårtensson | ............... | G01S 19/04 701/24 |
| 2024/0219910 A1 * | 7/2024 | Sørensen | ............... | E01C 23/163 |

FOREIGN PATENT DOCUMENTS

| | | | | |
|---|---|---|---|---|
| CN | 107153211 A | | 9/2017 | |
| CN | 107800200 A | | 3/2018 | |
| CN | 212969077 U | | 4/2021 | |
| EP | 3696576 A1 * | | 8/2020 | ......... G05D 1/6445 |
| WO | WO-2020027598 A1 * | | 2/2020 | ......... A01D 34/008 |
| WO | WO-2020027610 A1 * | | 2/2020 | ......... A01D 34/008 |

* cited by examiner

CHARGING STATION, INTELLIGENT ROBOT, AND CHARGING SYSTEM

CROSS-REFERENCE TO RELATED APPLICATIONS

The present disclosure is a continuation of international application No. PCT/CN2021/095123 filed on May 21, 2021, which claims priority to Chinese Patent Application No. "202020912281.9" filed by Ninebot (Beijing) Technology Co., Ltd on May 26, 2020 and entitled "Charging station".

TECHNICAL FIELD

The present disclosure relates to the technical field of charging, and particularly relates to a charging station, an intelligent robot, and a charging system.

BACKGROUND

In related technologies, a charging station for a mowing robot has a single function, and can only provide a charging function. When a positioning base station and/or other functional devices are provided, the positioning base station and/or the other functional devices are separately deployed and mounted, thereby increasing the space occupied by the charging station for the mowing robot, causing inconvenience in use of the charging station for the mowing robot, and increasing the mounting difficulty.

SUMMARY

The present disclosure is intended to solve at least one of the technical problems existing in the prior art. Therefore, an object of the present disclosure is to present a charging station that can reduce the space occupied by the charging station and reduce the mounting difficulty.

Another object of the present disclosure is to present an intelligent robot.

Still another object of the present disclosure is to present a charging system.

A charging station according to embodiments in a first aspect of the present disclosure includes: a control chip; a charging apparatus electrically connected to the control chip; and a differential positioning apparatus communicatively connected to the control chip. The control chip is configured to receive first observation information and position information of the charging station sent by the differential positioning apparatus, and send the first observation information and the position information to an intelligent robot, and configured to control the charging apparatus to charge the intelligent robot.

In the charging station according to an embodiment of the present disclosure, the charging apparatus is electrically connected to the control chip, and the differential positioning apparatus is communicatively connected to the control chip, thereby not only effectively guaranteeing that the charging station can charge a mowing robot, but also making the mowing robot obtain more accurate position information about the charging station by cooperation between the control chip and the differential positioning apparatus. Moreover, the charging station and the differential positioning apparatus share one control chip, and there is no need to provide two control chips, which reduces the number of chips, and thus reduces the space occupied by the chips.

According to some embodiments of the present disclosure, the charging station further includes: a mounting seat, where the differential positioning apparatus is arranged on top of the mounting seat, and the charging apparatus is arranged on a side face of the mounting seat.

According to some embodiments of the present disclosure, the control chip is arranged on a side of the mounting seat which is averted from the charging apparatus.

According to some embodiments of the present disclosure, the charging station further includes: a base plate; and a hood body connected to the base plate, where an accommodating space is defined between the hood body and the base plate, and the mounting seat is located within the accommodating space.

According to some embodiments of the present disclosure, the mounting seat has cross sectional areas gradually increasing from top to bottom, and the hood body has cross sectional areas gradually increasing from top to bottom.

According to some embodiments of the present disclosure, a power source is provided within the charging station, and the charging apparatus and the differential positioning apparatus are electrically connected to the power source.

According to some embodiments of the present disclosure, a positioning interface is provided in a lower part of the charging station, the positioning interface is electrically connected to the control chip, and the positioning interface is connected to a solenoid coil.

According to some embodiments of the present disclosure, the charging apparatus includes a wireless charging coil.

According to some embodiments of the present disclosure, the charging apparatus includes a charging interface or charging wire arranged on the mounting seat.

According to some embodiments of the present disclosure, the differential positioning apparatus includes a GPS antenna.

An intelligent robot according to embodiments in a second aspect of the present disclosure is configured to receive first observation information and position information of the charging station according to the embodiments in the first aspect of the present disclosure, and second observation information of the intelligent robot, compare the first observation information with the second observation information to obtain a corrected value, and correct position information of the intelligent robot based on the corrected value.

A charging system according to embodiments in a third aspect of the present disclosure includes: an intelligent robot; and the charging station according to the embodiments in the first aspect of the present disclosure, where the charging apparatus is configured to charge the intelligent robot, the differential positioning apparatus is configured to receive first observation information and position information of the charging station, and send the position information and the first observation information to the control chip; the control chip is configured to send the received position information and the received first observation information to the intelligent robot; and the intelligent robot is configured to receive the first observation information and the position information of the charging station, and second observation information of the intelligent robot, compare the first observation information with the second observation information to obtain a corrected value, and correct position information of the intelligent robot based on the corrected value.

According to some embodiments of the present disclosure, the intelligent robot is a mowing robot.

Additional aspects and advantages of the present disclosure will be partially given in the following description, and will partially become apparent from the following description, or will be understood from the practice of the present disclosure.

BRIEF DESCRIPTION OF THE DRAWINGS

The above and/or additional aspects and advantages of the present disclosure will become apparent and readily understood from the description of embodiments with reference to the accompanying drawings below.

REFERENCE NUMERALS IN THE FIGURES

Figure 1:
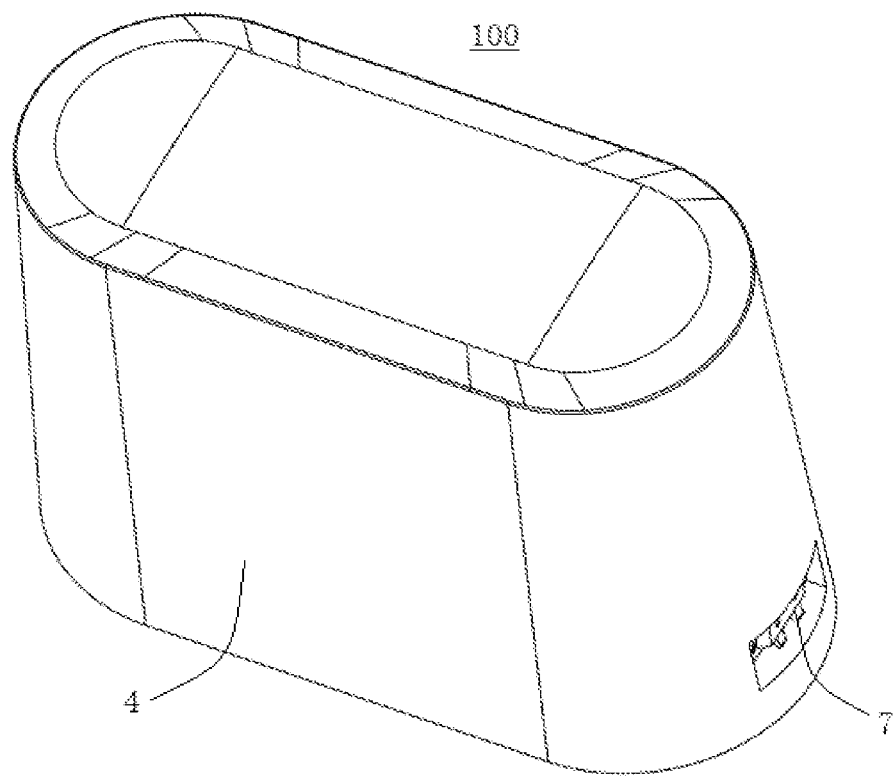
FIG. 1 is a schematic diagram of a charging station according to an embodiment of the present disclosure.

100: charging station;
1: control chip; 2: charging apparatus; 3: differential positioning apparatus;
31: GPS antenna; 4: hood body; 5: base plate; 6: mounting seat; 7: positioning interface.

DETAILED DESCRIPTION OF EMBODIMENTS

Embodiments of the present disclosure are described in detail below, example embodiments are described with reference to the accompanying drawings, and the embodiments of the present disclosure are described in detail below.

A charging station 100 according to embodiments in a first aspect of the present disclosure is described below with reference to FIG. 1-FIG. 4. The charging station 100 may be configured to charge an intelligent robot, e.g., a mowing robot (not shown in the figures). In the following description of the present disclosure, the charging station 100 for an intelligent robot, e.g., a mowing robot, is illustrated.

As shown in FIG. 1-FIG. 4, the charging station 100 according to the embodiments in the first aspect of the present disclosure includes a control chip 1, a charging apparatus 2, and a differential positioning apparatus 3.

Specifically, the charging apparatus 2 is electrically connected to the control chip 1, and the charging apparatus 2 is adapted to charge the mowing robot. The differential positioning apparatus 3 is communicatively connected to the control chip 1. The differential positioning apparatus 3 is adapted to receive first observation information and position information of the charging station 100, and send the position information and the first observation information to the control chip 1. The control chip 1 sends the received position information and the received first observation information to the mowing robot. The mowing robot is adapted to receive the first observation information and the position information of the charging station 100, and second observation information of the mowing robot, compare the first observation information with the second observation information to obtain a corrected value, and correct its own position information based on the corrected value to obtain accurate position information of the mowing robot.

For example, in the examples of FIG. 1-FIG. 4, the control chip 1, the charging apparatus 2, and the differential positioning apparatus 3 are mounted within the charging station 100, and the charging apparatus 2 can guarantee that the charging station 100 charges the mowing robot. When the mowing robot needs to be charged, a satellite may detect position of the charging station 100 in real time, and send the position information and the first observation information (e.g., observed carrier phase value) to the differential positioning apparatus 3. After receiving the position information and the first observation information from the satellite, the differential positioning apparatus 3 sends the position information and the first observation information (e.g., Radio Technical Commission for Maritime Services (RTCM) data) to the control chip 1. The control chip 1 may send the position information and the first observation information to the mowing robot by RTCM protocol. The mowing robot obtains a corrected value based on the position information and the first observation information sent from the charging station 100, and the second observation information collected by the mowing robot itself, and corrects its own position information based on the corrected value, such that the charging station 100 can obtain more accurate position information of the mowing robot, and such that the mowing robot can more accurately locate the position of the charging station 100. In addition, compared with a conventional charging station, the charging station 100 is provided with the differential positioning apparatus 3 and the charging apparatus 2, such that the charging station 100 have both a charging function and a positioning function, thus eliminating the need to deploy a separate positioning base station, thereby reducing the space occupied by the charging station 100, and reducing the mounting difficulty.

In the charging station 100 according to the embodiments of the present disclosure, the charging apparatus 2 is electrically connected to the control chip 1, and the differential positioning apparatus 3 communicatively connected to the control chip 1. The differential positioning apparatus 3 receives the first observation information and the position information of the charging station 100, and sends the position information and the first observation information to the control chip 1. The control chip 1 sends the position information and the first observation information to the mowing robot. The mowing robot obtains the corrected value based on the second observation information, and the position information and the first observation information sent from the charging station 100, such that the mowing robot corrects its own positioning based on the corrected value, thereby not only effectively guaranteeing that the charging station 100 can charge the mowing robot, but also making the mowing robot and the charging station 100 obtain more accurate relative position information by cooperation between the control chip 1 and the differential positioning apparatus 3. Moreover, the charging station and the differential positioning apparatus share one control chip, and there is no need to provide two control chips, which reduces the number of chips, and thus reduces the space occupied by the chips.

Figure 2:
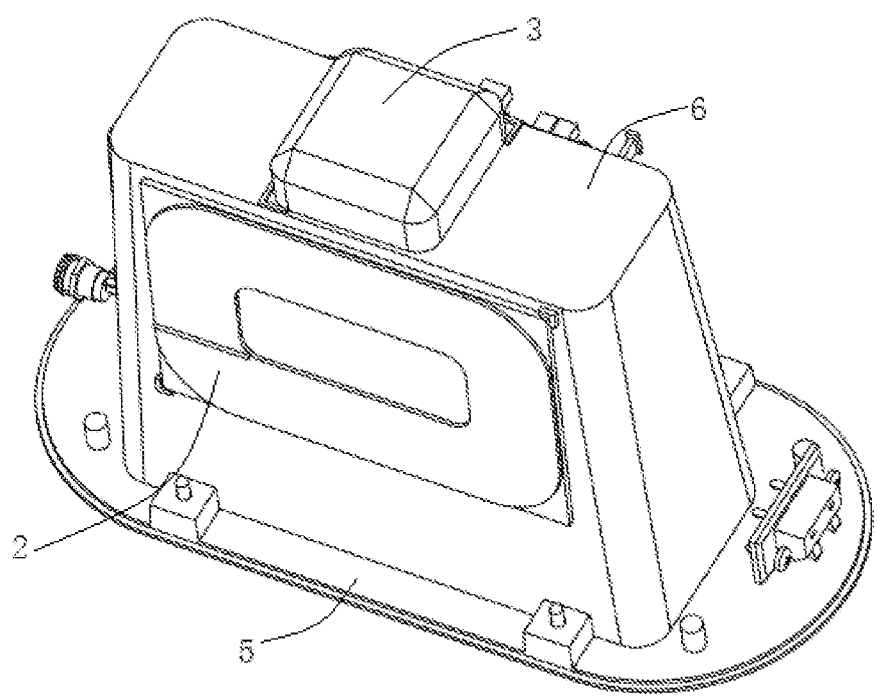
FIG. 2 is a schematic diagram of a charging station according to an embodiment of the present disclosure, where a hood body is not shown.
Figure 3:
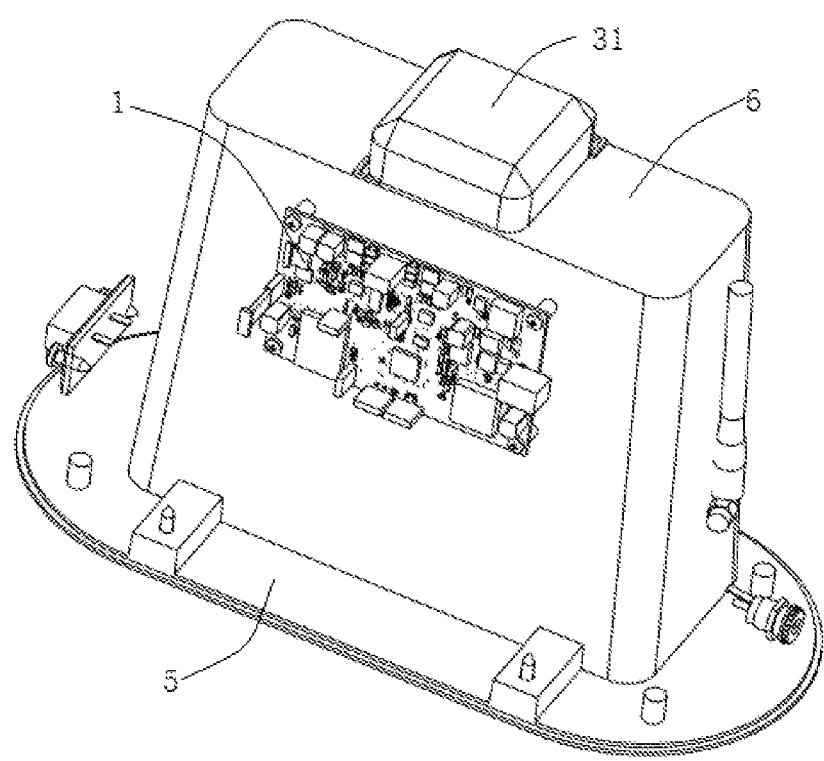
FIG. 3 is a schematic diagram of the charging station shown in FIG. 2 in another angle.
Figure 4:
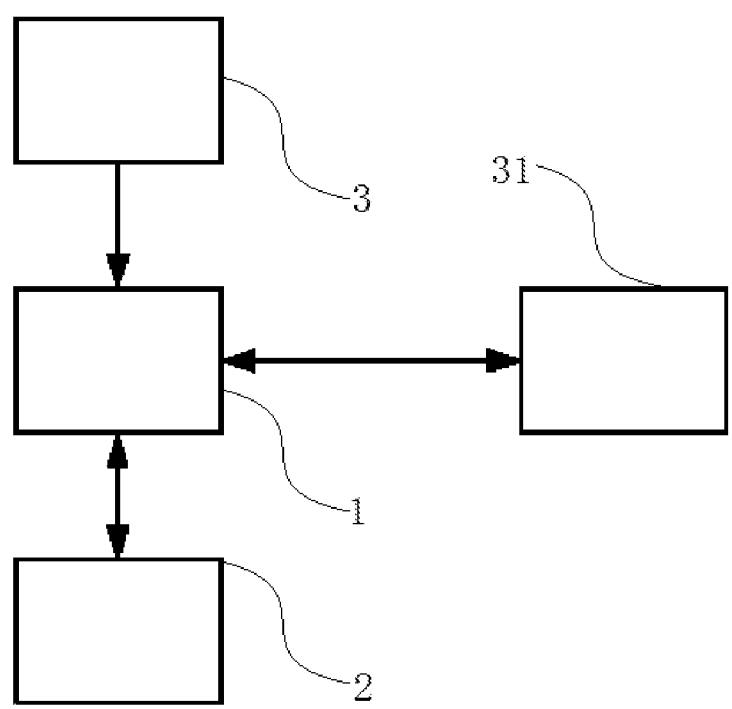
FIG. 4 is a block diagram of a control process of a charging station according to an embodiment of the present disclosure.

According to some specific embodiments of the present disclosure, as shown in FIG. 2 and FIG. 3, the charging station 100 includes a mounting seat 6, and the differential positioning apparatus 3 is arranged on top of the mounting seat 6, thereby guaranteeing that a GPS antenna 31 favorably receives and sends information. The charging apparatus 2 is arranged on a side face of the mounting seat 6, thus guaranteeing that the differential positioning apparatus 3 is spaced apart from the charging apparatus 2 to avoid interference with the signal of the differential positioning apparatus 3 during operation. Further, as shown in FIG. 3 and with reference to FIG. 2, the control chip 1 is arranged on a side of the mounting seat 6 which is averted from the charging apparatus 2. In this case, the control chip 1 and the charging apparatus 2 are arranged on two side faces of the mounting seat 6 respectively, thereby guaranteeing that the control chip 1, the charging apparatus 2, and the differential positioning apparatus 3 are spaced apart from each other, and effectively reducing the impact of the charging apparatus 2 and differential positioning apparatus 3 on the control chip 1.

According to some specific embodiments of the present disclosure, as shown in FIG. 1-FIG. 3, the charging station 100 further includes a base plate 5 and a hood body 4. The hood body 4 is connected to the base plate 5, where an accommodating space is defined between the hood body 4 and the base plate 5, and the mounting seat 6 is arranged on the base plate 5, and is located within the accommodating space. Both the differential positioning apparatus 3 and the charging apparatus 2 are located within the accommodating space defined by the hood body 4 and the base plate 5, thereby effectively guaranteeing that the differential positioning apparatus 3 and the charging apparatus 2 are clean, and prolonging the service life of the charging station 100.

In some alternative embodiments, the mounting seat 6 has cross sectional areas gradually increasing from top to bottom, and the hood body 4 has cross sectional areas gradually increasing from top to bottom. For example, referring to FIG. 2 and FIG. 3, longitudinal cross sections of the mounting seat 6 and the hood body 4 are substantially trapezoidal, thereby facilitating arrangement of the hood body 4 on the mounting seat 6. Further, an end with a larger cross sectional area of the mounting seat 6 is connected to the base plate 5, thereby guaranteeing that the charging station 100 is stable, while the mounting seat 6 and the hood body 4 have simple structures, and are readily processable.

According to some embodiments of the present disclosure, a power source (not shown in the figure) is provided within the charging station 100, and the charging apparatus 2 and the differential positioning apparatus 3 are electrically connected to the power source. Alternatively, a charging circuit (not shown in the figure) where the charging apparatus 2 is located and a positioning circuit (not shown in the figure) where the GPS antenna 31 is located may be independent of each other, and when the charging station 100 is operating, only the charging circuit or only the positioning circuit is in an operating state, or both the charging circuit and the positioning circuit are in operating states, and the operating states of the charging circuit and the positioning circuit do not interfere with each other. Such an arrangement reduces the interference between the charging circuit and the positioning circuit and facilitates subsequent inspection and maintenance of the charging circuit and the positioning circuit.

According to some embodiments of the present disclosure, as shown in FIG. 2 and FIG. 3, a positioning interface 7 is provided in a lower part of the charging station 100, the positioning interface 7 is electrically connected to the control chip 1, and the positioning interface 7 is connected to a solenoid coil (not shown in the figure). With such an arrangement, when the mowing robot is located in the vicinity of the charging station 100, the mowing robot can further determine the position of the charging station 100 through the solenoid coil within the positioning interface 7 to guarantee accurate positioning of the charging station 100.

In some alternative embodiments, the charging apparatus 2 may include a wireless charging coil. The wireless charging coil is connected to a power source and can generate an electromagnetic signal. A receiving terminal coil is provided within the intelligent robot, e.g., a mowing robot, corresponding to the charging station 100. The receiving terminal coil senses the electromagnetic signal of the wireless charging coil, thereby generating a current to charge the mowing robot. By wireless charging, such an arrangement eliminates the need to provide a charging wire and a charging interface on the charging station 100 and the mowing robot, thereby guaranteeing the simplicity of the appearance of the charging station 100 and the mowing robot.

Of course, the present disclosure is not limited to this. The charging apparatus 2 may further include a charging interface or charging wire arranged on the mounting seat 6. When the charging station 100 is charged, a charging wire or charging interface of the intelligent robot, e.g., a mowing robot, may be connected to the charging interface or charging wire on the mounting seat 6, thereby guaranteeing the charging needs of the mowing robot, and guaranteeing that the charging apparatus 2 has a simple structure and is readily processable.

According to some embodiments of the present disclosure, the differential positioning apparatus 3 includes a GPS antenna 31. The GPS antenna 31 is adapted to receive position information and first observation information of the charging station 100, and send the position information and the first observation information to the control chip 1. The GPS antenna 31 may be configured to capture a satellite, receive satellite positioning information, and convert electromagnetic wave energy of a wireless signal from the satellite into a current that is collectable and applicable by the control chip 1. Such an arrangement can guarantee that the control chip 1 can accurately receive the position information and the first observation information of the charging station 100.

With the charging station 100 according to the present disclosure, when the mowing robot needs to be charged, the satellite may detect the position of the charging station 100 in real time and send the position information and the first observation information to the differential positioning apparatus 3. After receiving the position information and the first observation information from the satellite, the differential positioning apparatus 3 sends the position information and the first observation information to the control chip 1. The control chip 1 sends the position information and the first observation information to a receiving apparatus of the mowing robot. The receiving apparatus of the mowing robot obtains the corrected value based on the position information and the first observation information of the charging station 100, and the second observation information collected by itself. The mowing robot corrects its own positioning based on the corrected value, such that the charging station 100 and the mowing robot obtain accurate position information of each other, and the mowing robot finds a corresponding charging station 100 based on the obtained accurate position information of the charging station 100. Then, a power pickup apparatus on the mowing robot is connected to the charging apparatus 2 on the charging station 100, such that the control chip 1 obtains information that the mowing robot needs to be charged, and finally the control chip 1 sends information on charging of the mowing robot, thereby realizing charging of the mowing robot.

An intelligent robot (not shown in the figure) according to embodiments in a second aspect of the present disclosure is configured to receive first observation information and position information of the charging station 100 according to the embodiments in the first aspect of the present disclosure, and second observation information of the intelligent robot, compare the first observation information with the second observation information to obtain a corrected value, and correct position information of the intelligent robot based on the corrected value.

The intelligent robot according to the embodiments of the present disclosure receives position information and first observation information of the charging station according to the embodiments in the first aspect of the present disclosure, and second observation information of the intelligent robot, compares the first observation information with the second observation information to obtain a corrected value, and corrects position information of the intelligent robot based on the corrected value, such that the charging station can obtain more accurate position information of the intelligent robot, and such that the intelligent robot can more accurately locate the position of the charging station.

A charging system (not shown in the figure) according to embodiments in a third aspect of the present disclosure includes: an intelligent robot and the charging station 100 according to the embodiments in the first aspect of the present disclosure. Specifically, the charging apparatus 2 of the charging station 100 is configured to charge the intelligent robot. The differential positioning apparatus 3 of the charging station 100 is configured to receive first observation information and position information of the charging station 100, and send the position information and the first observation information to the control chip 1 of the charging station 100. The control chip 1 of the charging station 100 is configured to send the received position information and the received first observation information to the intelligent robot. The intelligent robot is configured to receive the first observation information and the position information of the charging station 100, and second observation information of the intelligent robot, compare the first observation information with the second observation information to obtain a corrected value, and correct position information of the intelligent robot based on the corrected value.

The charging system according to the embodiments in the third aspect of the present disclosure is provided with an intelligent robot and a charging station, where a charging apparatus of the charging station charges the intelligent robot, a differential positioning apparatus of the charging station receives first observation information and position information of the charging station, and sends the position information and the first observation information to a control chip; the control chip sends the received position information and the received first observation information to the intelligent robot; and the intelligent robot receives the first observation information and the position information of the charging station, and second observation information of the intelligent robot, compares the first observation information with the second observation information to obtain a corrected value, and corrects position information of the intelligent robot based on the corrected value, such that the charging station and the intelligent robot can obtain accurate position information of each other, and such that the intelligent robot can more accurately locate the position of the charging station.

Alternatively, the intelligent robot is, but is not limited to, a mowing robot.

Other structures and operations of the charging station 100 according to the embodiments of the present disclosure are known to those of ordinary skills in the art and will not be described in detail herein.

In the description of the present disclosure, it should be understood that the directions or position relationships indicated by the terms, such as "longitudinal," "above," "below," "top," "bottom," "inner," and "outer," are based on the directions or position relationships shown in the accompanying drawings, are only provided to facilitate describing the present disclosure and simplifying the description, rather than indicating or implying that the apparatus or element referred to must have a specific direction, or be constructed and operated in a specific direction, and therefore cannot be understood as limitations of the present disclosure.

In the description of the present disclosure, it should be noted that, unless otherwise specifically defined and limited, the terms, such as "mounting," "connected," and "connection," should be understood in a broad sense, for example, may be a fixed connection, or a detachable connection, or an integrated connection; or may be a direct connection, or an indirect connection through an intermediate medium, or may be an internal communication between two elements. For those of ordinary skills in the art, the specific meanings of the above terms in the present disclosure may be understood according to specific circumstances.

In the description of the present specification, descriptions with reference to the terms, such as "some embodiments" or "an example," mean that specific features, structures, materials, or characteristics described with reference to the embodiment or example are included in at least one embodiment or example of the present disclosure. In the present specification, schematic expressions of the above terms do not necessarily refer to the same embodiments or examples.

While the embodiments of the present disclosure have been shown and described, those of ordinary skills in the art may understand that: a variety of variations, alterations, replacements, and modifications may be made to these embodiments without departing from the principle and objective of the present disclosure, the scope of which is limited by the appended claims and equivalents thereof.

The invention claimed is:

1. A charging station, comprising:
a control chip;
a charging apparatus electrically connected to the control chip; and
a differential positioning apparatus communicatively connected to the control chip;
wherein the control chip is configured to receive first observation information and position information of the charging station sent by the differential positioning apparatus, and send the first observation information and the position information to an intelligent robot, and configured to control the charging apparatus to charge the intelligent robot;
wherein the charging station further comprises a mounting seat, the charging apparatus is arranged on a first side face of the mounting seat, and the control chip is arranged on a second side face of the mounting seat opposing the first side face.

2. The charging station according to claim 1,
wherein the differential positioning apparatus is arranged on top of the mounting seat.

3. The charging station according to claim 2, wherein the charging station further comprises:
a base plate; and
a hood body connected to the base plate, wherein an accommodating space is defined between the hood body and the base plate, and the mounting seat is located within the accommodating space.

4. The charging station according to claim 3, wherein the mounting seat has cross sectional areas gradually increasing from top to bottom, and the hood body has cross sectional areas gradually increasing from top to bottom.

5. The charging station according to claim 2, wherein a positioning interface is provided in a lower part of the charging station, the positioning interface is electrically connected to the control chip, and the positioning interface is connected to a solenoid coil.

6. The charging station according to claim 2, wherein the charging apparatus comprises a wireless charging coil.

7. The charging station according to claim 2, wherein the charging apparatus comprises a charging interface or charging wire arranged on the mounting seat.

8. The charging station according to claim 1, wherein a power source is provided within the charging station, and the charging apparatus and the differential positioning apparatus are electrically connected to the power source.

9. The charging station according to claim 1, wherein a positioning interface is provided in a lower part of the charging station, the positioning interface is electrically connected to the control chip, and the positioning interface is connected to a solenoid coil.

10. The charging station according to claim 1, wherein the charging apparatus comprises a wireless charging coil.

11. The charging station according to claim 1, wherein the charging apparatus comprises a charging interface or charging wire arranged on the mounting seat.

12. The charging station according to claim 1, wherein the differential positioning apparatus comprises a GPS antenna.

13. The charging station according to claim 1, wherein the charging apparatus comprises a wireless charging coil, and the differential positioning apparatus comprises a GPS antenna, the GPS antenna being configured to: receive the first observation information and the position information of the charging station, and send the first observation information and the position information to the control chip such that the control chip sends the first observation information and the position information to the intelligent robot, and the wireless charging coil being configured to generate an electromagnetic signal based on information on charging of the intelligent robot sent by the control chip such that a receiving terminal coil provided within the intelligent robot senses the electromagnetic signal to generate a current to charge the intelligent robot.

14. The charging station according to claim 13, wherein the charging apparatus comprises a charging circuit, and the GPS antenna comprises a positioning circuit.

15. The charging station according to claim 13, wherein a power source is provided within the charging station, and the charging apparatus and the differential positioning apparatus are electrically connected to the power source.

16. The charging station according to claim 15, wherein the wireless charging coil is electrically connected to the power source.

17. An intelligent robot, configured to receive first observation information and position information of the charging station according to claim 1, and second observation information of the intelligent robot, compare the first observation information with the second observation information to obtain a corrected value, and correct position information of the intelligent robot based on the corrected value.

18. A charging system, comprising:
an intelligent robot; and
the charging station according to claim 1, wherein
the charging apparatus is configured to charge the intelligent robot,
the differential positioning apparatus is configured to receive first observation information and position information of the charging station, and send the position information and the first observation information to the control chip;
the control chip is configured to send the received position information and the received first observation information to the intelligent robot; and
the intelligent robot is configured to receive the first observation information and the position information of the charging station, and second observation information of the intelligent robot, compare the first observation information with the second observation information to obtain a corrected value, and correct position information of the intelligent robot based on the corrected value.

19. The charging system according to claim 18, wherein the intelligent robot is a mowing robot.

* * * * *